United States Patent [19]
Arnold et al.

[11] 3,876,396
[45] Apr. 8, 1975

[54] PROCESS FOR CLEANING GASES

[75] Inventors: Orlan M. Arnold, Norwalk; Carlo A. Vancini, Stamford, both of Conn.

[73] Assignee: Peabody ABC Corp., Warsaw, Ind.

[22] Filed: Nov. 13, 1973

[21] Appl. No.: 415,405

Related U.S. Application Data
[63] Continuation-in-part of Ser. No. 409,035, Oct. 24, 1973.

[52] U.S. Cl. .................. 55/89; 55/242; 55/257; 55/440; 55/443; 261/118
[51] Int. Cl. .............................................. B01d 47/06
[58] Field of Search .......... 98/50; 55/84, 85, 89, 90, 55/92–94, 96, 220, 223, 228, 242, 257, 258, 259, 260, 440, 442–444; 261/118

[56] References Cited
UNITED STATES PATENTS

| | | | |
|---|---|---|---|
| 879,273 | 2/1908 | Kinealy | 55/257 |
| 2,358,508 | 9/1944 | Hersh | 55/444 |
| 2,608,267 | 8/1952 | Ortgies | 55/228 |
| 2,643,736 | 6/1953 | Smith | 55/440 |
| 3,254,475 | 6/1966 | Farr et al. | 55/242 |
| 3,646,728 | 3/1972 | Holler | 55/257 |
| 3,748,835 | 7/1973 | Panzica | 55/228 |
| 3,767,177 | 10/1973 | Engalitcheff et al. | 55/257 |
| 3,795,089 | 3/1974 | Reither | 55/228 |

*Primary Examiner*—Bernard Nozick
*Attorney, Agent, or Firm*—Robert H. Bachman

[57] ABSTRACT

Process for cleaning gases, especially the dust laden air adjacent a coal transfer means and other particulate laden gases or air, including introducing the gases into a gas washing zone, spraying the gases with liquid in the washing zone and drying the gases by removing the entrained liquid droplets from the gases.

14 Claims, 5 Drawing Figures

PROCESS FOR CLEANING GASES

CROSS REFERENCE TO RELATED APPLICATIONS

This application is a continuation-in-part of copending application Ser. No. 409,035, for Apparatus for Cleaning Gases, by Arnold and Vancini, filed Oct. 24, 1973.

BACKGROUND OF THE INVENTION

It is highly desirable to develop efficient methods for cleaning gases. It is particularly desirable to develop such methods which are suitable for cleaning the air and dust adjacent a coal transfer apparatus in view of the large amount of dust which is generated by such an apparatus. It is also desirable to develop such methods which is versatile so that it may readily be used for the removal of other air or gas borne particulate ranging in sizes from macro to submicron dimensions originating from any of a variety of sources.

Accordingly, it is a principal object of the present invention to provide an efficient and versatile process for cleaning gases, such as the dust which is generated adjacent a coal transfer apparatus, as by grinding, handling, processing, etc.

It is an additional object of the present invention to provide such a process which is utilizable in a location where a limited amount of space is available, such as in a mine tunnel adjacent a coal transfer means. A further object is to provide such a process which has the necessary high capacity for removing large amounts of dust and particulate from the air. An additional object of the present invention is to develop a process as aforesaid which is versatile so that it may be used generally in cleaning particulate laden gases or air.

Further objects and advantages of the present invention will appear from the ensuing specification.

SUMMARY OF THE INVENTION

In accordance with the present invention the foregoing objects and advantages are readily achieved and a process provided for cleaning gases especially suitable for cleaning the dust from the air adjacent a coal transfer device, although the present invention is well suited generally for cleaning particulate laden gases or air and for removal of particulate from other emission generating devices or processes. The process of the present invention comprises introducing the gases to be cleaned into a gas washing zone, spraying the gases with a liquid spray in the gas washing zone, drying the gases by impinging the water laden gases on a series of fixed, spaced, curved vanes so that a controlled portion of the water laden gas impinges upon each of said vanes and entrained droplets are separated therefrom, and removing the separated liquid and cleaned gases.

When the process of the present invention is utilized for cleaning the dust from the air adjacent a coal transfer device or from other particulate generating devices or processes, the gases to be cleaned are confined adjacent the gas washing zone and a positive flow of gas is induced.

BRIEF DESCRIPTION OF THE DRAWINGS

The features of the process of the present invention will be more readily apparent to one skilled in the art from reading the following detailed description of a representative embodiment of the present invention when considered in the light of the accompanying drawings in which.

DETAILED DESCRIPTION

Figure 1:
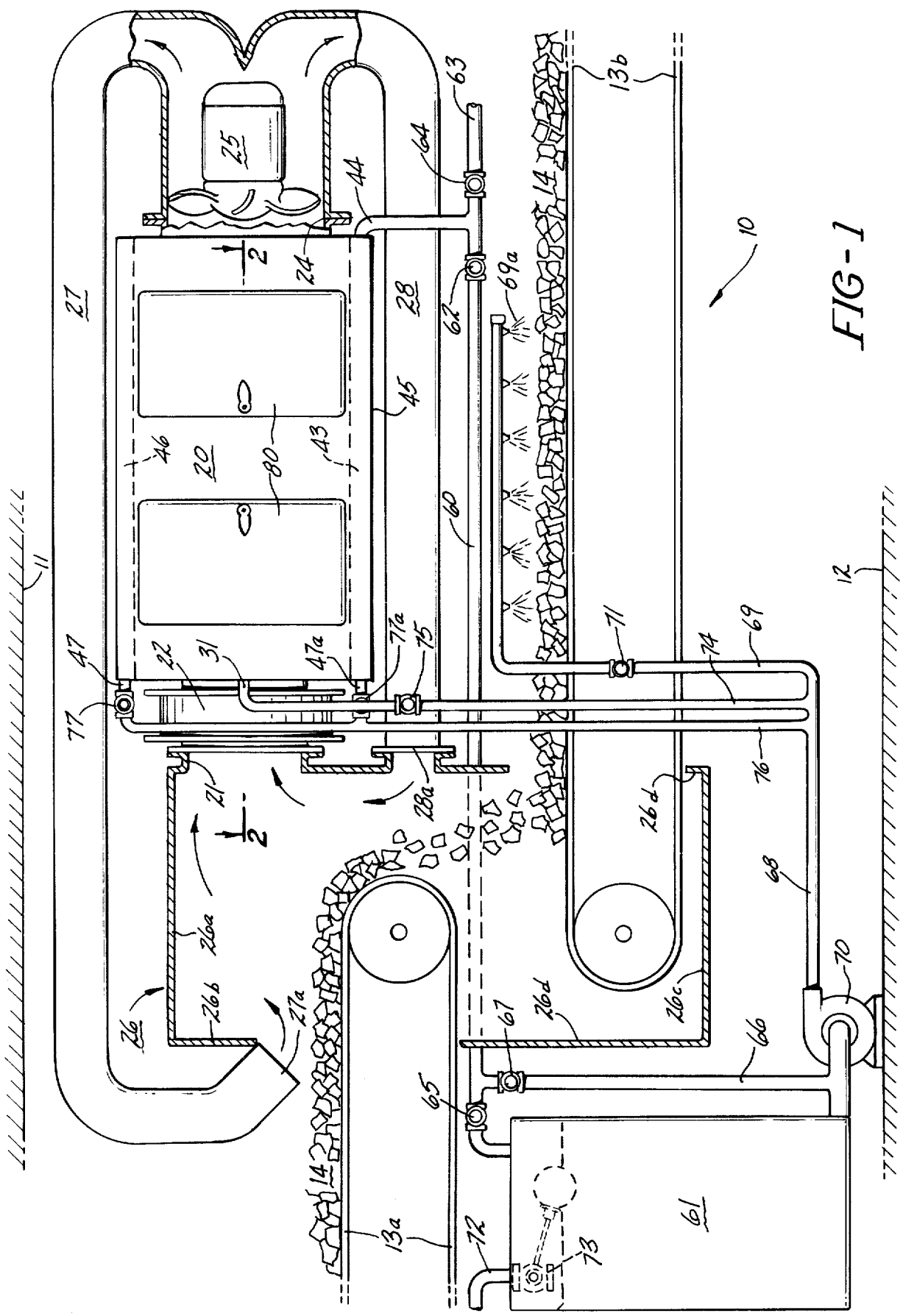
FIG. 1 is a sectional view of a coal transfer device in a mine including a cleaning apparatus for carrying out the process of the present invention.

FIG. 1 shows a conventional coal transfer device 10 in a mine tunnel having a roof 11 and a floor 12. The coal transfer device includes a series of high speed endless belts, such as belt 13a and 13b. The leading end of belt 13b is beneath the trailing end of belt 13a so that the coal 14 carried on belt 13a falls from belt 13a to belt 13b and continues on belt 13b. The coal travels at very high speeds and generates a great deal of coal dust especially adjacent the trailing end of belt 13a and the leading end of belt 13b. The mine tunnel represents a particularly difficult problem in view of the limited amount of space available, the tunnel being narrow and having a low ceiling, and the very large amount of dust generated. Thus, one requires a high capacity, compact and highly efficient gas cleaning apparatus and procedure which is capable of operating in a horizontal plane in a narrow and low ceiling tunnel.

The gas cleaning apparatus 20 includes an inlet 21 above the trailing end of belt 13a for introducing the gases to be cleaned, a gas washing zone 22 communicating with the inlet, a gas drying zone 23 communicating with the washing zone, and a gas outlet 24 communicating with the gas drying zone for removing the cleaned gases. Means is provided adjacent the gas outlet 24, such as fan 25, for inducing a positive flow of gas into the inlet 21. An enclosure or housing 26 is provided adjacent inlet 21 for confining the gases to be cleaned adjacent said inlet, including upper wall 26a located above inlet 21 and above the trailing end of belt 13a, having a descending wall 26b, and including lower wall 26c located below the leading end of belt 13b, having ascending walls 26d on opposite ends of lower wall 26c.

The cleaned gas is caused to flow through outlet 24 by means of fan 25, through upper and lower exhaust channels 27 and 28, respectively, passing respectively above and below apparatus 20 and having their exhaust outlets 27a and 28a adjacent inlet 21, all in the direction of the arrows. Thus a positive flow of air is induced, with the air flow being in the major direction of the air flow in the tunnel. Even if, however, back drafts cause an oppositely directed air flow in the tunnel, the apparatus 20 is a tight enclosure which is able to operate efficiently combined with fan 25 and enclosure 26. Alternatively, one might provide an air escape means adjacent outlet 24 to allow all or part of the cleaned air to be discharged in the tunnel and further aid in improving the air quality in the tunnel. As a further alternative, one might place the fan 25 adjacent the inlet 21, or inside the apparatus 20, or use two or more smaller capacity fans in different locations. Exhausting of air from the unit may be in a recycled or push-pull air system as described in FIG. 4, or so that the exhausted air is put into a disperser in the space such as in a tunnel or room for distributing and directing the clean air in the proper direction.

Figure 2:
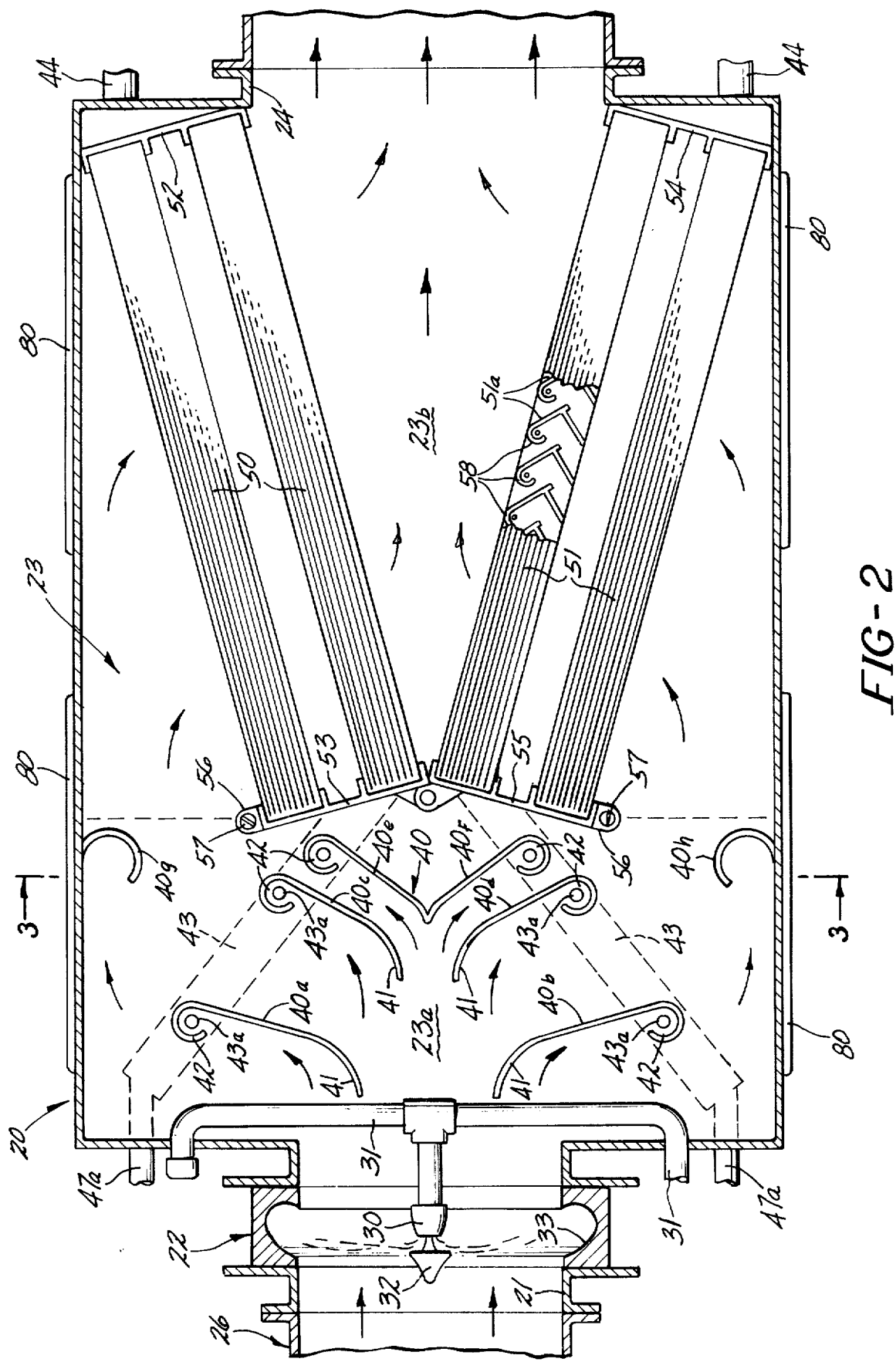
FIG. 2 is a horizontal sectional view of the cleaning apparatus of FIG. 1 taken on line 2—2 of FIG. 1.

Referring to FIG. 2, the dirty gas is introduced into inlet 21 and into the gas washing zone 22 communicating with the inlet. The gas washing zone is intended to provide a curtain of water of high kinetic energy to thoroughly wet the incoming gas stream and by impact with the airborne particles captures them so that the dust particles contained in the gas stream are thoroughly enveloped by the liquid droplets and removed from the airflow pattern. A powerful, high kinetic energy spray means should be employed in the washing zone to serve this purpose which provides a uniform distribution across the path of the airflow, such as that described in copending application Ser. No. 318,692 by Orlan M. Arnold and Carlo A. Vancini, filed Dec. 26, 1972.

A particularly suitable arrangement is shown in FIG. 2 and includes a spray nozzle 30, mounted on a supply pipe 31, disposed axially of the washing zone 22 and carrying a disc 32 having a curved under surface by which the jet of liquid from the nozzle 30 is deflected radially outwardly to form a radial spray of high kinetic energy around its entire periphery. The nozzle 30 is disposed in alignment with curved, annular recess 33 located in the wall of the washing zone 22 so that the outwardly directed spray is reversed in direction by curved surface 33 with a minimum loss of kinetic energy to pass inwardly through the gas stream in the washing zone 22. Naturally, if desired, a plurality of nozzles may be utilized in the washing zone, or a plurality of washing zones.

Figure 3:
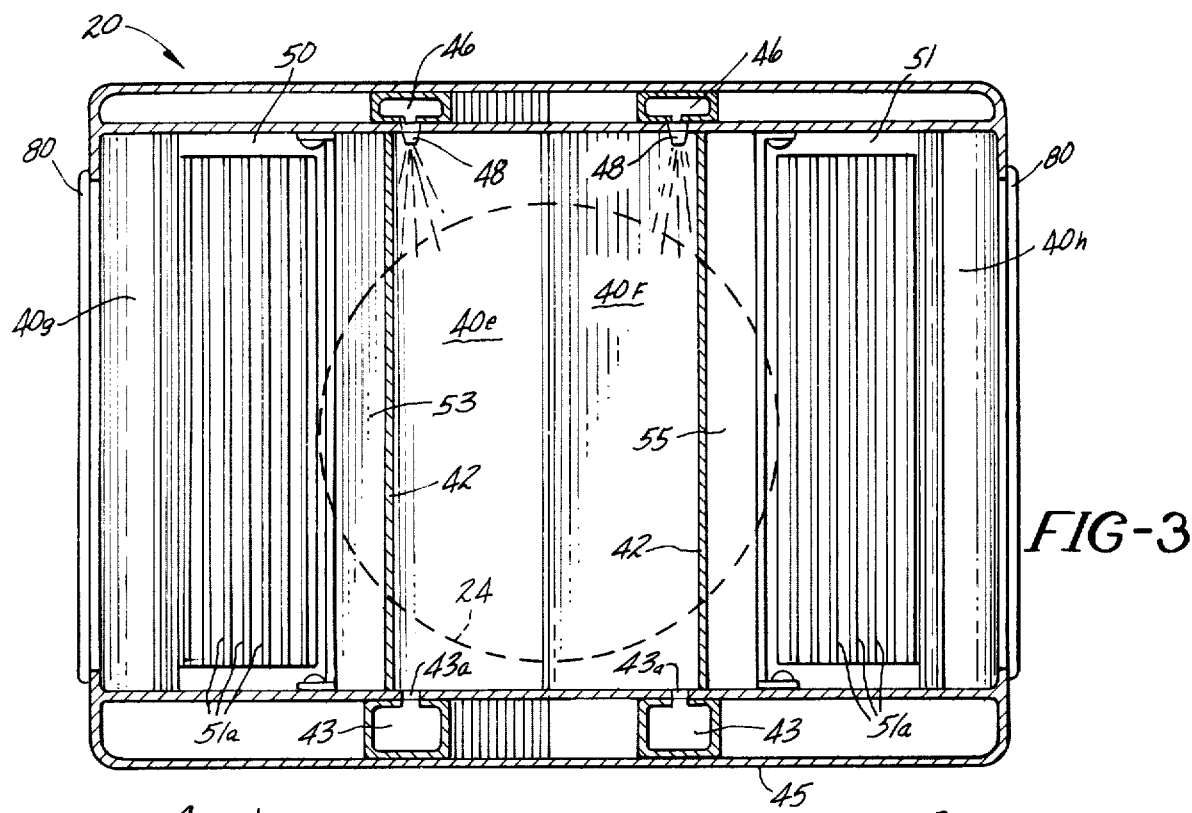
FIG. 3 is a vertical sectional view of the cleaning apparatus taken on line 3—3 of FIG. 2.
Figure 5:
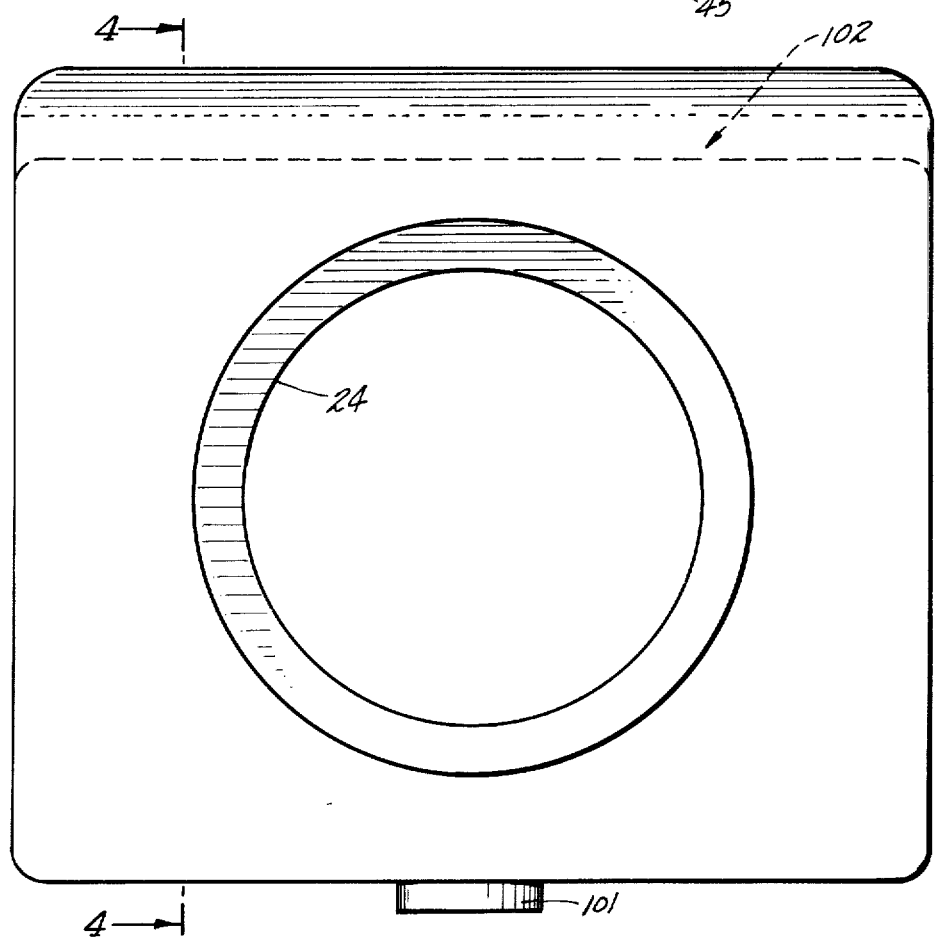
FIG. 5 is an end view of the outlet end of the modified apparatus of FIG. 4.

The gas containing entrained liquid droplets passes from the washing zone 22 to the drying zone 23. The drying zone 23 includes a primary drying zone 23a and a secondary drying zone 23b. The water laden dirty air passes into the primary drying zone 23a and is divided into fractions by a series of fixed, spaced, curved vanes 40 arranged adjacent the gas washing zone so that a controlled portion of the water laden gas impinges upon each of the vanes and liquid droplets are separated therefrom, with the controlled impingement being such as to provide a metered distribution of the bulk air from the wash chamber onto the vanes. The forward portion 41 of each vane is curved towards the washing zone and the trailing portion 42 of each vane is curved at least 180° and preferably at least 240° to form a channel for collection of entrained droplets. Three sets of vanes are shown, a first set of vanes 40a and 40b closest to the washing zone, a second intermediate set of vanes 40c and 40d, and a third set of vanes 40e and 40f farthest from the washing zone. Each vane has an oppositely directed vane, with their respective curved forward portions 41 spaced apart a predetermined distance. Thus, the first set of vanes 40a and 40b have their respective curved forward portions 41 spaced farthest apart, and the second set of vanes 40c and 40d have their respective curved forward portions 41 spaced relatively closer together than the first set, and the third set of vanes 40e and 40f have their respective curved forward portions contacting each other so that all of the water laden dirty air is caused to contact one of the vanes 40 and that said air is divided into relatively equal fractions for water elimination. Optionally a fourth set of curved vanes 40g and 40h is provided adjacent the wall of the gas drying zone to catch water laden air which may be thrown towards the wall. Naturally, more than three sets of vanes may be provided in the primary drying zone 23a. Also, the configuration of the vanes may be varied to, for example, provide a sharp, right angle curve on forward portions 41 instead of the gradual curved surfaces shown. The primary drying zone 23a is particularly important as it provides the zone for separation of the dirty slurry. The separated slurry flows down channels 42 into drainage trough or passages 43 (see FIG. 3) beneath each channel and communicating with a liquid outlet 44. If desired, passages 43 may be eliminated and the floor 45 of the cleaning apparatus be gradually sloped towards liquid outlet 44. Washing troughs 46 fed by inlet 47 may be provided above each of the channels 42 for washing channels 42 via spray nozzles 48. Troughs 43 are cleaned by pipe 47a.

Directly behind the primary drying zone 23a is the secondary drying zone 23b. If desired, one may dispense with the secondary drying zone and utilize only the primary zone; however, the embodiment described is preferred for maximum efficiency in a high capacity, high efficiency, compact unit.

The secondary drying zone 23b includes two sets of fixed, spaced, curved parallel moisture eliminators or vanes 50 and 51 between outlet 24 and the primary drying zone 23a, support means 52 supporting vanes 51 as a unit. Each set 50 and 51 includes a plurality of curved individual vanes 51a forming a tortuous path for introducing turbulence and for providing impingement surfaces for droplet separation. The individual vanes are desirably provided in segment sections, with the ability to remove them as to lock them into position. If desired, sectional segments may each carry a plurality of vanes. The sections may be removed as well as locked in place, as by plate 56 and bolt 57. The trailing end of each of said vanes is curved at least 180° and preferably at least 240° to form a channel 58 for liquid drainage, with trough or drainage passageway 43 being located beneath each channel 58, said trough 43 being an extension of the trough beneath channels 42 in the primary drying zone 23a. The tortuous path formed by vanes 51a and the channels 58 also serves to prevent the airflow from whipping through vanes 50 and 51 with incomplete water separation resulting. The vanes in both the primary and secondary drying zones extend the entire height of the cleaning apparatus to insure efficient operation.

As shown in FIG. 2, set 50 is spaced from set 51 to form a V-shaped assembly with the base of the V being adjacent the primary drying zone and wide portion of the V being adjacent the outlet 24 so that a portion of the gas passing from the primary zone 23a into the secondary zone 23b impinges upon each of said vanes 51a and different volumes of air are readily accommodated both in the inlet to zone 23b and in the outlet of zone 23b. Therefore, the assembly of moisture eliminators 50 and 51 is at an acute angle with respect to the entering gases and the individual vanes 51a may be spaced apart approximately uniformly as shown. Alternatively, the angle may be varied and the spacing varied to compensate therefor. Also other arrangements may be employed, such as a single set placed across the secondary drying zone. In addition, different types of drying units may be employed, such as baffle trays with slots and centrifugal separators or deflector plates of known construction, as shown in more detail in copending application Ser. No. 306,611, for Apparatus For Cleaning Gases by O.M. Arnold et al.

The secondary water supply fed by inlet pipes 47 represents a particular advantage as it passes over channels 42 and 58 for cleaning thereof. The water supply may be arranged to be manually or automatically operated, could be placed on an automatic cycle, and could be adapted to use fresh or recycled water.

The cleaned and dried air passes out gas outlet 24 as previously described. Referring again to FIG. 1, the separated liquid flows out liquid drain 44 via line 60 into tank 61. Valve 62 is provided on line 60 so that the liquid flow may be diverted to line 63 carrying valve 64 for drainage into a pond or a cleaning tank spaced a distance from the cleaning apparatus, or alternatively the liquid flow from line 63 may be dispersed on the coal belt 13b with controlled or intermittent flow depending if coal is present on the belt. Valve 65 is provided on line 60 adjacent holding tank 61 so that all or a portion of the liquid may be diverted to line 66 carrying valve 67 from whence it is pumped to lines 68 and 69 via pump 70 for providing a spray 69a on coal 14 being carrying by belt 13b. Valve 71 is provided on line 69 for controlling the liquid flow to the coal. Although only one pump is shown in FIG. 1, it is preferred that a separate line and pump be used for this purpose since the liquid being carried thereby is a dirty slurry which may require a special pump, thereby enabling the use of a high pressure pump for supplying water to washing zone 22. Also, if desired, an air suction pump may be provided adjacent liquid outlet 44 to aid in drawing the liquid down to the bottom of the cleaning apparatus and in the removal of the dirty water from the cleaning apparatus. Normally, however, sufficient suction will be provided by fan 25 adjacent outlet 24 to obviate the necessity of such an air suction pump. As indicated hereinabove, one may place fan 25 adjacent inlet 21, or inside apparatus 20, or use two or more smaller fans in different locations. When fan 25 is placed after the drying zone as shown in FIG. 1, if the full suction is generated in the drying zone there may not be appreciable suction available to help remove the liquid from the cleaning apparatus. One may place an obstruction of suitable size at exit 24 so that there is a differential air pressure at that point, and one might require a higher horsepower fan. Alternatively, where the fan is placed between the two drying chambers, a baffled passageway may be employed in order to generate sufficient suction to remove the liquid. It should be emphasized that the liquid flow should be shut off if the fan is shut off or stopped for any reason.

Tank 61 may be provided with a water make up line 72 with a float valve 73 in the tank to maintain the liquid in the tank at a desired level. Naturally, wetting agents or the like may be added to tank 61 via make up line 72; for example, it may be desirable to have a reagent such as a surfactant to be functional in the recycled liquid in the wash chamber and also in the moisture eliminator to assist drainage. Also, means may be provided in tank 61 to clean the dirt from the water returned to the tank and separate the dirt therefrom in a known manner.

Pump 70 is provided to pump liquid via lines 68 and 74 to the washing zone 22, with line 74 being provided with valve 75 to control liquid flow therein. Line 76 carrying valve 77 is also connected to line 68 for providing wash liquid to lines 47. Naturally, as indicated hereinabove, separate pumps and lines may be provided for each of these functions. Also, if desired, a filter may be provided on line 74 and/or 76 to insure that clean water is fed by these lines. This is especially desirable if a single pump is used.

Access doors 80 are provided on the cleaning apparatus 20 to enable ease of cleaning and repair.

Figure 4:
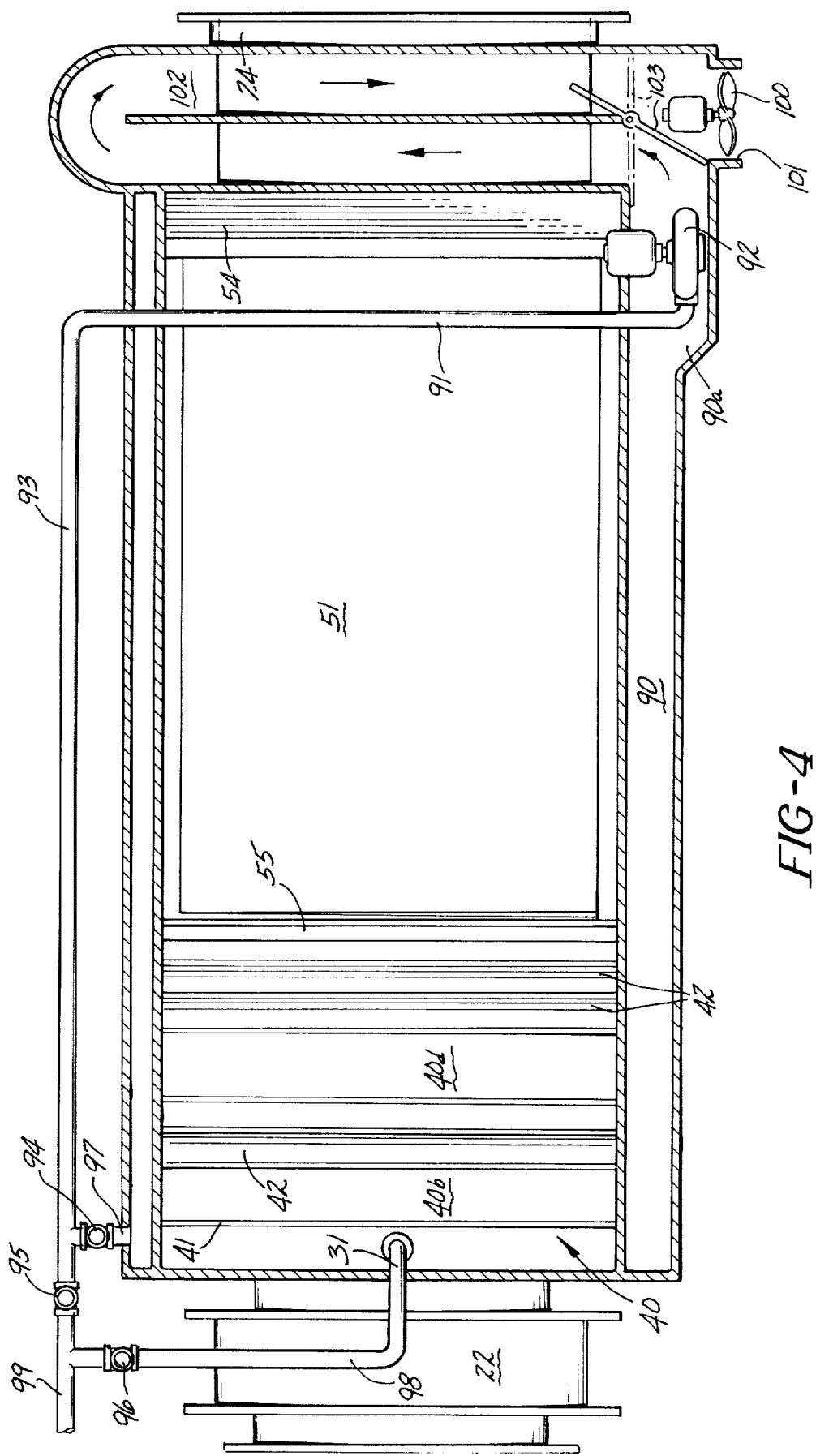
FIG. 4 is a sectional view of a modified apparatus for carrying out the process of the present invention taken on line 4—4 of FIG. 5.

The modification of FIG. 4, wherein like numbers show like parts, shows a large water compartment 90 beneath the vanes 40 in order to provide sufficient liquid to utilize in a closed system with the need for limited water make up. Thus, the liquid is transferred to line 91 via pump 92 to line 93 from whence it is directed via valves 94 and 95 and 96 to either channel cleaning line 97 or nozzle supply line 98. Make-up line 99 is provided if necessary. Compartment 90 is provided with a sump 90a adjacent the outlet end of the apparatus for collection of water for recycling. Fan 100 is provided adjacent exhaust line 101. Air channel 102 is provided around exhaust line 24 with tilt floor 103 so that when the floor 103 is in the open position shown in solid line in FIG. 4 a positive airflow is caused through channel 102 aiding in water drainage towards pump 92. When the floor is in the position shown in the dashed lines, channel 102 is blocked and water drainage via exhaust line 101 is caused.

This invention may be embodied in other forms or carried out in other ways without departing from the spirit or essential characteristics thereof. The present embodiment is therefore to be considered as in all respects illustrative and not restrictive, the scope of the invention being indicated by the appended claims, and all changes which come within the meaning and range of equivalency are intended to be embraced therein.

What is claimed is:

1. A method for cleaning gases comprising: introducing said gases into a gas washing zone; spraying said gases with liquid in said washing zone; drying said gases by impinging the water laden gases on a series of fixed, spaced, outwardly extending, curved vanes so that the water laden gas impinges thereon and entrained droplets are separated therefrom, said vanes having a leading edge and a trailing edge, wherein said leading edges are spaced progressively farther from the washing zone, and wherein said vanes are spaced progressively closer together from the washing zone towards the outlet so that a controlled portion of the water laden gas passes between and impinges upon said vanes to provide a metered distribution of the water laden gas onto individual vanes; removing the separated liquid in collection channels associated with said vanes; removing the cleaned gases through an outlet; and inducing a positive gas flow in the washing and drying steps.

2. A method according to claim 1 wherein the water laden gas impinges upon three sets of vanes, with the third set spaced farthest from the washing zone, the second set spaced relatively closer to the washing zone and with the first set spaced nearest to the washing zone.

3. A method according to claim 1 wherein said vanes have leading edges curved towards said washing zone and trailing edges having a hook-shaped portion leading to said collection channels for removal of separated liquid.

4. A method according to claim 1 wherein the separated liquid is recycled into said gas washing zone.

5. A method according to claim 1 including the step prior to removing the cleaned gases, of further drying said gases by passing the gases through a second series of fixed, spaced, curved parallel vanes forming a tortuous path for inducing controlled turbulence and causing entrained droplets to impinge on the surfaces of the vanes and be separated thereby.

6. A method according to claim 5 wherein the droplets separated by the second series of vanes flow in collection channels associated with said second series and are removed thereby.

7. A method according to claim 5 wherein in said further drying step the gases are passed through two series of said vanes.

8. A method according to claim 5 including the step of spacing the vanes in said second series so that a controlled portion of the gases impinge upon each of the vanes to provide a metered distribution of gas onto individual vanes.

9. A method for cleaning the air adjacent a coal transfer means comprising: introducing the gases to be cleaned into a gas washing zone adjacent a coal transfer means; spraying said gases with liquid in said washing zone; drying said gases by impinging the water laden gases on a series of fixed, spaced, outwardly extending, curved vanes so that entrained droplets are separated therefrom, said vanes having a leading edge and a trailing edge, wherein said leading edges are spaced progressively farther from the washing zone, and wherein said vanes are spaced progressively closer together from the washing zone towards the outlet so that a controlled portion of the water laden gas passes between and impinges upon said vanes to provide a metered distribution of water laden gas onto individual vanes; removing the separated liquid; and removing the cleaned gases through an outlet.

10. A method according to claim 9 wherein said vanes have leading edges curved towards said washing zone and trailing edges having a hook-shaped portion for removal of separated liquid.

11. A method according to claim 9 wherein the water laden gas impinges upon three sets of vanes, with the third set spaced farthest from the washing zone, the second set spaced relatively closer to the washing zone, and with the first set spaced nearest to the washing zone.

12. A method according to claim 9 including the step prior to removing the cleaned gases, of further drying said gases by passing the gases through a second series of fixed, spaced, curved parallel vanes forming a tortuous path for inducing controlled turbulence and causing entrained droplets to impinge on the surfaces of the vanes and to be separated thereby.

13. A method according to claim 9 wherein the separated liquid is recycled into said gas washing zone.

14. A method according to claim 9 including the step of confining the gases to be cleaned adjacent the gas washing zone and inducing a positive gas flow in the washing and drying steps.

* * * * *